US009646729B2

United States Patent
Lahoda et al.

(10) Patent No.: US 9,646,729 B2
(45) Date of Patent: May 9, 2017

(54) LASER SINTERING SYSTEMS AND METHODS FOR REMOTE MANUFACTURE OF HIGH DENSITY PELLETS CONTAINING HIGHLY RADIOACTIVE ELEMENTS

(71) Applicant: WESTINGHOUSE ELECTRIC COMPANY LLC, Cranberry Township, PA (US)

(72) Inventors: Edward Jean Lahoda, Edgewood, PA (US); Fausto Franceschini, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 734 days.

(21) Appl. No.: 13/744,711

(22) Filed: Jan. 18, 2013

(65) Prior Publication Data

US 2014/0203460 A1 Jul. 24, 2014

(51) Int. Cl.
- *G21C 21/02* (2006.01)
- *C04B 35/01* (2006.01)
- *G21C 3/04* (2006.01)
- *B33Y 10/00* (2015.01)
- *B29C 67/00* (2017.01)

(52) U.S. Cl.
CPC .............. *G21C 21/02* (2013.01); *C04B 35/01* (2013.01); *B29C 67/0077* (2013.01); *B33Y 10/00* (2014.12); *C04B 2235/32* (2013.01); *C04B 2235/665* (2013.01); *C04B 2235/77* (2013.01); *G21C 2003/045* (2013.01)

(58) Field of Classification Search
CPC .... G21C 21/02; G21C 2003/045; B28B 1/001

USPC .............. 264/497, 40.1, 492, 407, 308, 0.5; 425/375, 174.4

See application file for complete search history.

(56) References Cited

U.S. PATENT DOCUMENTS

| 4,871,479 A | 10/1989 | Bachelard et al. |
| 5,227,608 A * | 7/1993 | Yoshida ............... B23K 26/122 219/121.68 |
| 5,431,967 A | 7/1995 | Manthiram et al. |

(Continued)

FOREIGN PATENT DOCUMENTS

| CN | 1976800 A | 6/2007 |
| WO | 2004/038729 A1 | 5/2004 |

OTHER PUBLICATIONS

International Search Report and Written Opinion of the International Searching Authority for PCT/US2013/076334 dated Sep. 19, 2014 (Forms PCT/ISA/220, PCT/ISA/210, PCT/ISA/237).

*Primary Examiner* — Nahida Sultana
(74) *Attorney, Agent, or Firm* — Joseph C. Spadacene; Westinghouse Electric Company LLC

(57) ABSTRACT

The invention relates to remotely operated laser sintering systems and methods for manufacturing pellets containing highly radioactive elements. The highly radioactive elements can be recovered from used nuclear fuels. The systems and methods of the invention employ a feed composition including one or more highly radioactive elements and a ceramic matrix material. The feed composition is distributed in the form of a layer and sintered by directing at least one laser beam to form a pattern in the layer of the feed composition. The pattern corresponds to the shape of the pellet. Further, the sintering process can be repeated as necessary to achieve a pre-determined pellet height.

6 Claims, 2 Drawing Sheets

(56) References Cited

U.S. PATENT DOCUMENTS

| | | | | |
|---|---|---|---|---|
| 5,585,020 A * | 12/1996 | Becker | B22F 1/0018 | 219/121.85 |
| 5,790,621 A * | 8/1998 | Picco | G21C 21/02 | 134/1 |
| 6,126,884 A * | 10/2000 | Kerekes | B29C 67/0055 | 264/40.1 |
| 6,132,667 A * | 10/2000 | Beers | B29C 67/0092 | 264/401 |
| 6,241,934 B1 * | 6/2001 | Everett | B29C 67/0066 | 264/401 |
| 6,299,429 B1 * | 10/2001 | Xuan | G11B 5/84 | 219/121.68 |
| 6,372,678 B1 * | 4/2002 | Youngman | C04B 35/18 | 166/280.1 |
| 7,700,032 B1 * | 4/2010 | Lu et al. | | 264/400 |
| 8,293,155 B2 * | 10/2012 | Hafer | B23K 26/0876 | 219/121.67 |
| 8,393,289 B2 * | 3/2013 | Quick | B82Y 30/00 | 118/50.1 |
| 8,523,554 B2 * | 9/2013 | Tung | B29C 67/0081 | 222/233 |
| 8,992,815 B2 * | 3/2015 | Hu | B01J 13/0086 | 241/1 |
| 2002/0107510 A1 * | 8/2002 | Andrews | A61B 18/20 | 606/10 |
| 2005/0263934 A1 | 12/2005 | Chung et al. | | |
| 2006/0119012 A1 * | 6/2006 | Ruatta | B29C 67/0077 | 264/497 |
| 2007/0196561 A1 | 8/2007 | Philippi et al. | | |
| 2010/0094266 A1 * | 4/2010 | Travish | H01J 35/14 | 606/15 |
| 2010/0264820 A1 * | 10/2010 | Sumitomo | H01J 61/025 | 313/639 |
| 2011/0160104 A1 * | 6/2011 | Wu | C04B 35/195 | 507/269 |
| 2013/0314504 A1 * | 11/2013 | Zenzinger | B29C 67/0077 | 348/46 |

* cited by examiner

LASER SINTERING SYSTEMS AND METHODS FOR REMOTE MANUFACTURE OF HIGH DENSITY PELLETS CONTAINING HIGHLY RADIOACTIVE ELEMENTS

BACKGROUND

1. Field

This invention pertains to laser systems and methods which are useful, in particular, for the remote preparation of high density pellets which include a ceramic matrix material and highly radioactive elements.

2. Description of Related Art

High level nuclear fuel waste is generated as a result of the reprocessing of used nuclear fuel from the operation of commercial nuclear power plants throughout the world. In order to dispose of this waste, it is necessary to recover and reduce the long lived highly radioactive elements contained therein. The long lived highly radioactive elements can include Americium (Am), Curium (Cm), Plutonium (Pu), Neptunium (Np), Protactinium (Pa), Californium (Cf), Uranium (U), Thorium (Th), and certain fission products, such as Technetium (Tc)-99, Iodine (I)-129, Zirconium (Zr)-93, Selenium (Se)-79 and Tin (Sn)-126. U can be contaminated with U-232 and/or U-234 and Th can be contaminated with Th-228. Certain isotopes of these nuclear fuel elements have very high and penetrating radiation fields. The radiation fields increase even further when irradiated Th and U are recycled due to the build-up of Th-228, U-232 and associated decay products. In addition, further contamination with radioactive fission products typically formed in a fission reactor may occur. Reducing the radioactivity of the high level waste can be carried out by forming pellets containing oxide, silicide, nitride, or carbide of these highly radioactive elements with a thorium or uranium or zirconium oxide, silicide, nitride or carbide matrix, and then exposing the pellets to an intense neutron spectrum of a nuclear reactor which will ultimately reduce the content of these radioactive elements by transmutation into stable fission products. The high and penetrating radiation fields of the highly radioactive elements require that the manufacturing process be accomplished remotely in a heavily-shielded location.

Based on operational requirements for a commercial nuclear plant, the fuel pellets should have a high density (e.g., greater than 85% smeared theoretical density) in order to provide satisfactory performance. The complex pelletizing and sintering equipment and industrial pellet manufacturing techniques that are known in the art for producing high density fuel are not suitable for use in a heavily shielded, remotely operated manufacturing cell.

Thus, there is a need in the art to design and develop systems and processes for sintering and pelletizing high density, e.g., greater than 85% smeared theoretical density, highly radioactive element-containing pellets in a heavily shielded, remotely operated area. Further, it is desired that the sintering and pelletizing processes can be carried out from a remote location, e.g., inside the heavily shielded area, using equipment which requires minimal maintenance throughout its lifetime and allows for straightforward process automation.

SUMMARY

In one aspect, this invention provides a laser sintering system to remotely prepare a fuel pellet for use in a nuclear reactor. The system includes a feed composition including at least one highly radioactive element in a form selected from the group consisting of oxide, silicide, nitride, carbide and mixtures thereof, and a ceramic matrix material. The feed composition is in a dry form. The system also includes a shielded enclosure having a flat surface disposed therein to receive and hold a layer of the feed composition. The system further includes at least one laser structured to direct a beam to sinter at least one pattern in the layer of the feed composition and to form a pellet. The controls for the at least one laser are positioned outside of the shielded enclosure. The at least one pattern corresponds to a pre-determined shape of the pellet.

The shielded enclosure can have a temperature in a range from 1000° C. to 2000° C.

The beam of the at least one laser can be directed by a reflective device positioned above the flat surface.

In certain embodiments, the at least one highly radioactive element is selected from the group consisting of Americium, Curium, Plutonium, Neptunium, Protactinium, Californium, Uranium, Thorium, fission products found in reprocessed nuclear fuel material, and mixtures thereof. The Uranium can be contaminated with U-232 and/or U-234 and the Thorium can be contaminated with Th-228. The fission products can be selected from the group consisting of Cesium, Strontium, Technetium, Ruthenium, and mixtures thereof. The ceramic matrix material can be selected from the group consisting of oxide, nitride, carbide, silicide, and mixtures thereof. Further, the ceramic matrix material can be selected from the group consisting of oxide, nitride, carbide, and silicide of Uranium, Thorium, Zirconium, Protactinium, Plutonium, and mixtures thereof. The pellet can have a density of about 85% or greater theoretical density. Also, the feed composition can be in the form of a powder.

Further, the layer can have a substantially uniform thickness in a range from 5 to 100 microns.

Furthermore, the at least one pattern can be in the shape of a circle to produce a cylindrical pellet.

In certain embodiments, the matrix material is selected from the group consisting of Thorium Oxide, Zirconium Oxide, Uranium Oxide, and mixtures thereof.

In another aspect, this invention provides a laser sintering method for remotely preparing a fuel pellet for use in a nuclear reactor. The method includes preparing a feed composition in a dry form including at least one highly radioactive element in a form selected from the group consisting of oxide, silicide, nitride, carbide and mixtures thereof, and a ceramic matrix material. The method also includes obtaining a shielded enclosure having a flat surface disposed therein, distributing the feed composition onto the flat surface forming a first layer, employing at least one laser and directing a beam of the at least one laser toward the first layer of the feed composition wherein the at least one laser is operated from controls positioned outside of the shielded enclosure, and forming at least one pattern within the first layer, wherein the shape of the at least one pattern corresponds to a pre-determined shape of the pellet.

In certain embodiments, the method described above is repeated for distributing and sintering a second layer onto the first layer for preparing the pellet having an increased height. Moreover, the above-described method can be repeated a plurality of times for sequentially forming a plurality of layers onto the first layer until a pre-determined height of the pellet is achieved. Each of the plurality of layers can have a thickness in a range from 5 to 100 microns.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
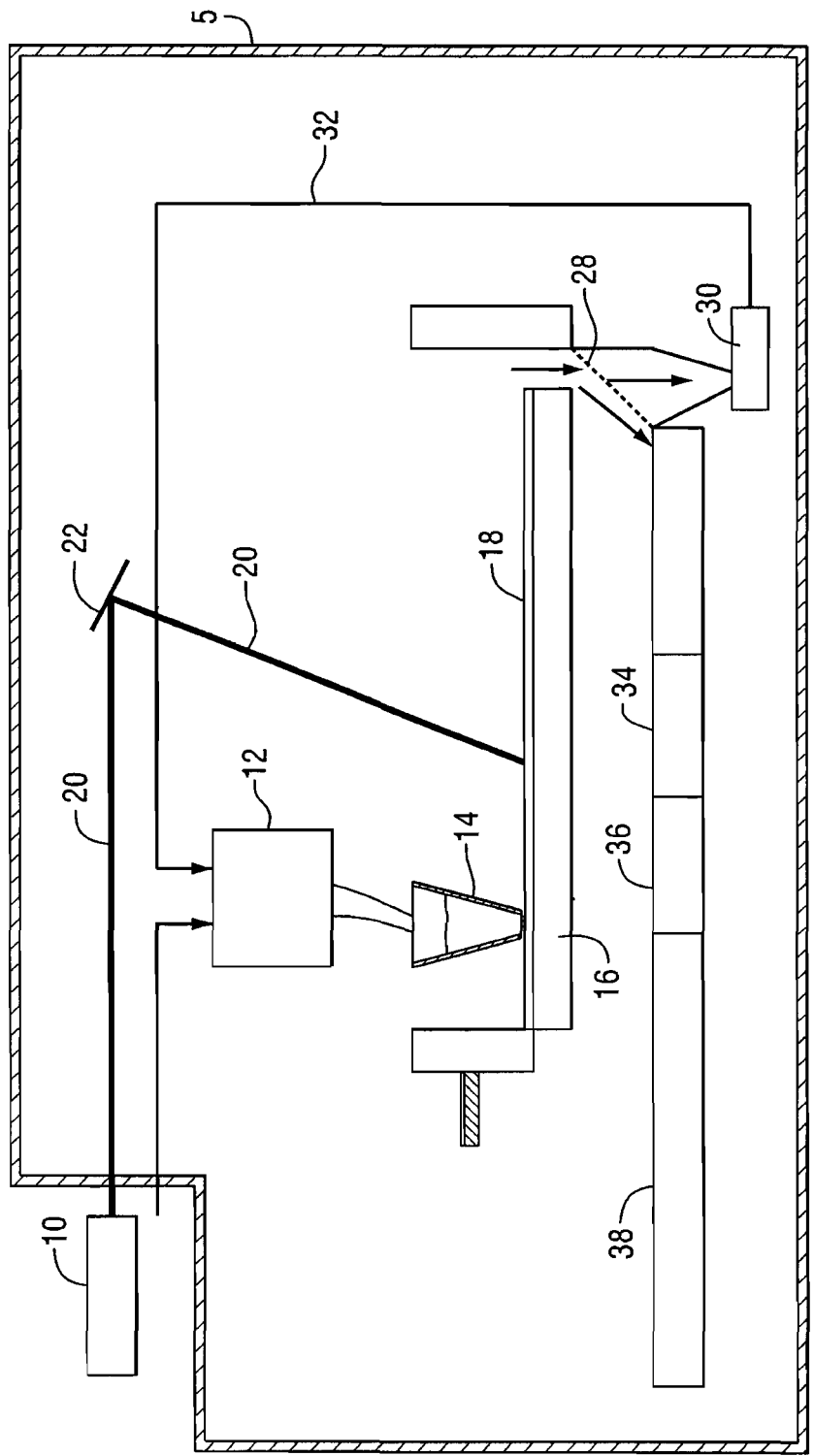
FIG. 1 shows a schematic of a remote laser manufacture process for producing pellets containing radioactive elements in accordance with certain embodiments of the invention.

The invention relates to remotely operated laser sintering systems and methods for manufacturing fuel pellets containing highly radioactive elements. The highly radioactive elements can originate from used or spent nuclear fuel. For example, long half-life, highly radioactive elements can be recovered from materials obtained from the reprocessing of used nuclear fuels and can include fission product contaminants. In the invention, these radioactive elements are combined with a ceramic matrix material to form the pellets. In general, the resultant pellets can be used in a fuel rod of an operating nuclear reactor, such as a pressurized water nuclear reactor, boiling water reactor, heavy water reactor, reduced moderation reactor or fast reactor.

The nuclear fuel generally includes highly radioactive and long half-life elements. These elements can be in the form of oxide, silicide, nitride, carbide and mixtures thereof. The highly radioactive and long half-life elements can include transmutation products and fission products. As used herein, the term "transmutation products" refers to materials formed in a reactor due to the absorption of neutrons by isotopes. As used herein, the term "fission products" refers to materials formed by the fissioning of uranium atoms. The radioactive transmutation products can include Americium (Am), Curium (Cm), Plutonium (Pu), Neptunium (Np), Protactinium (Pa), Californium (Cf), Uranium (U) and Thorium (Th). In certain embodiments, the U can be contaminated with U-232 and/or U-234 and the Th can be contaminated with Th-228. The fission products can include Cesium (Cs), Strontium (Sr), Technetium (Tc), Ruthenium (Ru), and mixtures thereof. In certain embodiments, the fission products can include Tc-99, Iodine (I)-129, Zirconium (Zr)-93, Selenium (Se)-79 and Tin (Sn)-126.

In the invention, in certain embodiments, the invention includes at least one radioactive transmutation product. In certain other embodiments, the invention includes at least one radioactive fission product in addition to the at least one radioactive transmutation product. In certain other embodiments the presence of U contaminated with U-232 and/or U-234, and Th contaminated with Th-228 is optional.

In certain embodiments, the highly radioactive elements can also be potentially radiotoxic.

The ceramic matrix material can include oxide, nitride, silicide, carbide and mixtures thereof. Further, the ceramic matrix material can include one or more of oxide, nitride, silicide and carbide of fertile or inert materials. In certain embodiments, the ceramic matrix material includes oxide, nitride, silicide or carbide of U, Th, Zirconium (Zr), Pa, Pu and mixtures thereof. In certain embodiments, the matrix material can include Th Oxide, U Oxide, Zr Oxide and mixtures thereof.

At least one highly radioactive element is combined with the ceramic matrix material to form a feed composition. The feed composition is in a dry form, such as but not limited to a powder. The feed composition can also include other materials and additives that are known in the art for producing pellets for use in a nuclear reactor fuel rod.

The feed composition is distributed on a flat surface, such as a tray, to form a bed or layer thereon. It is preferable for the feed composition to be substantially uniformly distributed on the flat surface. Further, it is preferred that placement of the feed composition is such that it does not form a mound or pile on the flat surface. The thickness of the bed or layer can vary. In certain embodiments, the layer is a thin layer and the thickness can be in a range from 5 to 100 microns or from 10 to 100 microns.

Due to the high radioactivity, and potential radiotoxicity, of elements used in the invention, it is preferred for the flat surface or tray to be positioned in a shielded enclosure, such as a heavily-shielded chamber. The shielded enclosure is typically maintained at an elevated temperature, e.g., above ambient or room temperature. In certain embodiments, the temperature of the shielded enclosure is in a range from about 1000° C. to about 2000° C.

One or more lasers are employed to sinter the feed composition. The laser(s) can include a wide variety of products known in the art and commercially available. The one or more lasers and/or the control motor(s) associated therewith can be located outside of the shielded area such that the sintering process can be controlled remotely. Thus, the control(s) and/or laser(s) can be positioned and operated from outside of the shielded enclosure while the laser beam(s) is operable inside of the shielded enclosure. This design and configuration is advantageous due to the radioactivity, and potential radiotoxicity, of the feed composition. The highly radioactive elements that are present in the feed composition have high and penetrating radiation fields and therefore, conventional manufacturing techniques are not suitable.

In certain embodiments, the laser beam(s) is directed by a reflective device, a fiber optic device, or a similar device. In certain embodiments, the device can be a mirror, such as a servo-controlled mirror, or fiber optic cable. The reflective device or the like is located in the shielded enclosure and positioned above the bed or layer of feed composition. The direction of the laser beam(s) can be positioned using x-y controller motors from the laser(s) located outside of the shielded enclosure. The laser beam(s) is directed toward and is in contact with at least a portion of the bed or layer of feed composition on the flat surface. In directing the beam(s), the beam(s) is handled such that one or more patterns are formed in the feed composition. The shape of the patterns corresponds to the intended or desired shape of the resultant pellet. For example, if a cylindrical pellet is intended, the beam(s) is directed to form one or more circular patterns in the layer or bed of feed composition. In certain embodiments, the sintered, patterned layer of feed composition can form a pellet. In other embodiments, the sintered, patterned layer of feed composition can form a base for a pellet, and additional layers can be added onto the base.

In certain embodiments, following laser sintering of a first layer or bed of feed composition to form a pattern for a pellet, a second layer of feed composition may be applied to the sintered first layer to increase the height of the pellet. The laser beam(s) is directed to the second layer which is distributed over, e.g., on top of, the first layer (or base layer). This second layer is sintered in substantially the same pattern as the first layer such that the second layer is added to the first layer, e.g., deposited on top of the first layer, to increase the overall height of the pellet. If the desired or pre-specified height of the pellet is achieved following sintering of the second layer of feed composition, the process is ended. If, however, the desired height of the resultant pellet after sintering two layers of feed composition is not achieved, a third layer and optionally subsequent or additional layers may be added to the feed composition bed on the flat surface and sintered to further increase the height of the pellet until the desired height of the pellet is achieved.

As previously described for the first or base bed or layer of feed composition, the second, third and subsequent layers of feed composition are each typically a thin layer which can vary in thickness. In certain embodiments, each of the layers can have a thickness in a range from 5 to 100 microns or from 10 to 100 microns. Further, each of the second, third and subsequent layers is sintered in substantially the same shape or pattern, e.g., a circle, as the first layer in order to form a substantially uniform pellet having a corresponding pattern or shape, e.g., a cylinder.

The desired height of the pellet can vary. In certain embodiments, the height of the pellet is from 1 to 500 mm or from 10 to 50 mm.

The desired diameter of the pellet can also vary. In certain embodiments, the diameter of the pellet is from 1 to 30 mm or from 5 to 10 mm.

In order for the resulting pellets to be useful in an operating nuclear reactor, the pellets are manufactured to have a high density. As used herein and the claims, the term "high density" refers to about 85% or greater theoretical density.

FIG. 1 shows a remote laser manufacturing system 1 for preparing in a remote location high density pellets containing highly radioactive elements, in accordance with certain embodiments of the invention. FIG. 1 includes a shielded enclosure 5 and a laser 10. Positioned within the shielded enclosure 5 are a hopper 12 and a distributer 14. A dry feed composition including highly radioactive elements and matrix is loaded into the hopper 12 and is then fed into the distributer 14. The distributer 14 releases and distributes the feed composition onto a tray 16 to form a first layer 18 of feed composition. The laser 10 emits a beam 20 which is directed toward a mirror 22 positioned within the shielded enclosure 5. The beam 20 is reflected by the mirror 22 and directed toward the first layer 18 of feed composition. As a result, the beam 20 sinters the first layer 18. The first layer 18 can be sintered in patterns.

Figure 2:
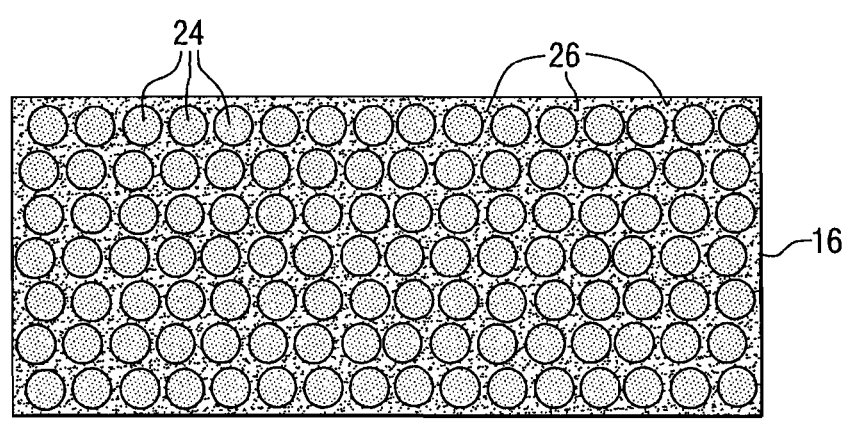
FIG. 2 shows a schematic of a top view of a feed composition tray having sintered pellet shapes and unsintered powder in accordance with certain embodiments of the invention.

FIG. 2 shows a top view of a tray 16 having a plurality of sintered pellet shapes 24 formed by directing the beam 20 onto the first layer 18 of the feed composition. The area 26, outside the circumference of the sintered pellet shapes 24, is unsintered feed composition.

Further, FIG. 1 shows that the sintered pellet shapes 24 (shown in FIG. 2) can be passed from the tray 16 through a screen 28 to separate the sintered pellet shapes 24 from unsintered feed composition. The unsintered feed composition can be collected in a holder and powder miller 30 and transported through a return line 32 and loaded (e.g., recycled) into the hopper 12. The sintered pellet shapes 24 can be transported to a grinder 34 to grind the sintered pellet shapes to a pre-specified diameter, to a cleaner 36 to remove residual feed composition therefrom, and then to a fuel rod loader 38 for loading the sintered pellet shapes 24 into a nuclear reactor (not shown).

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A remotely-operated laser sintering system to prepare a fuel pellet for use in a nuclear reactor, comprising:
   a shielded enclosure;
   a powder feed composition, comprising:
     at least one highly radioactive element; and
     a ceramic matrix material;
   at least one laser positioned outside of the shielded enclosure, structured to emit a laser beam into the shielded enclosure, to operate and to control the laser beam from outside the shielded enclosure, and to sinter a layer of the powder feed composition; and
   a plurality of components positioned inside of the shielded enclosure, the plurality of components comprising:
     a flat surface structured to receive and hold the layer of the powder feed composition for sintering;
     a hopper structured to contain the powder feed composition;
     a distributer structured to substantially uniformly distribute the powder feed composition from the hopper onto the flat surface in a form of the layer; and
     a directing device structured to direct the laser beam emitted into the shielded enclosure toward the flat surface such that the laser beam contacts at least a portion of the layer of the powder feed composition, to sinter at least one pattern in the layer of the powder feed composition to form the fuel pellet, the at least one pattern corresponding to a pre-determined shape of the fuel pellet,
   wherein the system is effective to produce the fuel pellet having a pre-specified height, such that if the fuel pellet is less than the pre-specified height, the fuel pellet provides a base layer and the distributer is structured to substantially uniformly distribute the powder feed composition from the hopper onto the base layer in the form of a subsequent layer, and the directing device is structured to direct the laser beam such as to contact at least a portion of the subsequent layer of the powder feed composition, to sinter the at least one pattern in the subsequent layer of the powder feed composition to form the fuel pellet.

2. The system of claim 1, wherein the plurality of components inside of the shielded enclosure further comprises a screen to separate the pellets from unsintered powder feed composition.

3. The system of claim 1, wherein the plurality of components inside of the shielded enclosure further comprises a powder mill to hold unsintered powder feed composition and a return line to transport the unsintered powder feed composition into the feed mechanism.

4. The system of claim 1, wherein the plurality of components inside of the shielded enclosure further comprises a grinder to receive and grind the fuel pellet to a pre-specified diameter, a cleaner, and a fuel rod loader.

5. The system of claim 1, wherein the directing device is selected from the group consisting of a mirror and a fiber optic cable positioned above the flat surface.

6. The system of claim 1, wherein the enclosure has a temperature in a range of from 1000° C. to 2000° C.

* * * * *